A. R. TKACH.
TRACTOR DRIVE WHEEL.
APPLICATION FILED JAN. 7, 1916.
1,212,284.
Patented Jan. 16, 1917.
2 SHEETS—SHEET 1.
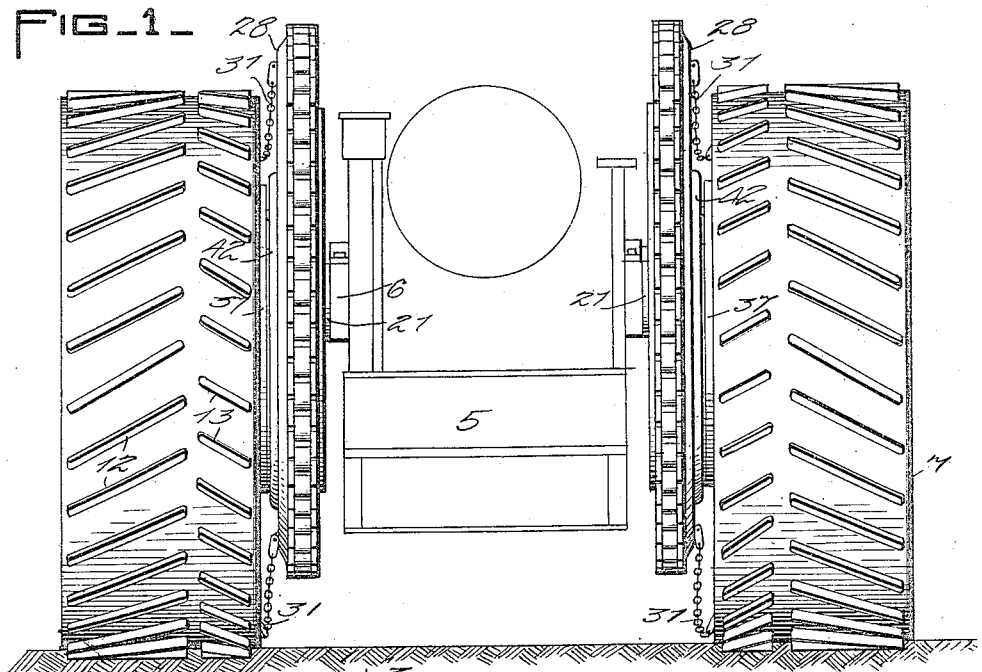
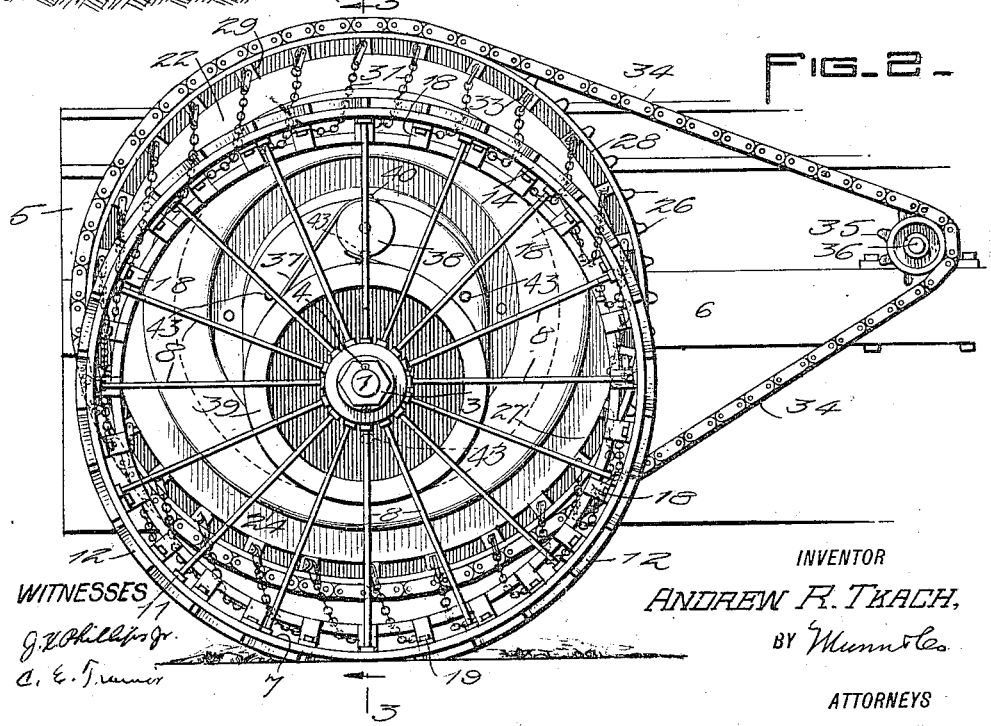
INVENTOR
ANDREW R. TKACH,
BY Munn & Co.
ATTORNEYS A. R. TKACH.
TRACTOR DRIVE WHEEL.
APPLICATION FILED JAN. 7, 1916.
1,212,284.
Patented Jan. 16, 1917.
2 SHEETS—SHEET 2.
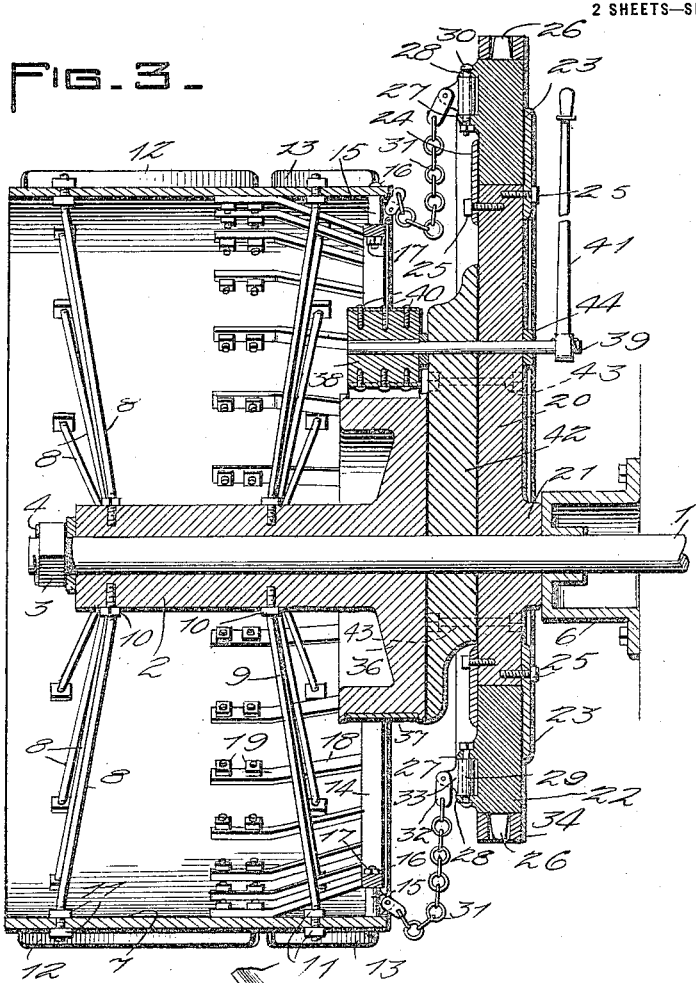
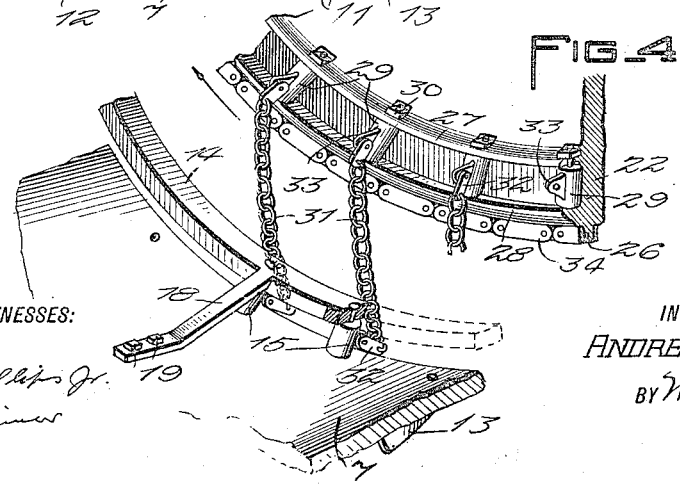
WITNESSES:
INVENTOR
ANDREW R. TKACH,
BY Munn & Co.
ATTORNEYS ial State Patent Office.

ANDREW R. TKACH, OF LAKEFIELD, MINNESOTA.

TRACTOR DRIVE-WHEEL.

1,212,284.

Specification of Letters Patent. Patented Jan. 16, 1917.

Application filed January 7, 1916. Serial No. 70,825.

*To all whom it may concern:*

Be it known that I, ANDREW R. TKACH, a citizen of the United States, and a resident of Lakefield, in the county of Jackson and State of Minnesota, have invented certain new and useful Improvements in Tractor Drive-Wheels, of which the following is a specification.

My invention is an improvement in tractor drive wheels, and the invention has for its object to provide a wheel of the character specified, wherein the tractor wheel proper is connected to an eccentrically mounted driving ring by a series of flexible members, the ring being mounted at such a point that the tractive power is exerted on the wheel at the point where it will act to the best advantage to drive the tractor wheel.

In the drawings: Figure 1 is a rear view of a pair of the improved wheels in use; Fig. 2 is a side view; Fig. 3 is a section on the line 3—3 of Fig. 2, looking in the direction of the arrows adjacent to the line, and Fig. 4 is a perspective view showing the connection between the drive wheel and the tractor wheel.

The present embodiment of the invention is shown in connection with an axle 1, in which the hub 2 of the wheel is arranged, and the said hub is held in place by a nut 3 and a cotter pin 4, which keys the nut in place.

The road locomotive or the like, indicated generally at 5, has a cap-shaped bearing member 6 for the axle, and the drive wheel to be later described in detail is arranged on the axle adjacent to the bearing. The wheel proper consists of a shell or rim portion 7, which is connected to the hub, by a plurality of series of spokes 8 and 9, respectively, the spokes being similar and oppositely arranged. Each of the spokes of each series has its inner end threaded into an opening in the hub, and a lock nut 10 is threaded onto each spoke at the hub. The outer end of each spoke is passed through an opening in the rim portion, and lock nuts 11 are threaded onto the spokes at the inner and outer faces of the rim portion. The series 8 of spokes are bent outwardly from the hub toward the rim portion, and the spokes 9 are bent inwardly, that is, in the opposite direction to the spokes 8. Thus each series of spokes is dished to resist end thrust on the hub with respect to the rim.

Each wheel is provided with a series 12 of cleats or mud guards, and a series 13, the series 12 being arranged near the outer edge of the rim, while the series 13 is arranged near the inner edge of the rim. The cleats of each series are parallel, and the cleats of the series are inclined in opposite directions, as shown, and the cleats 12 are of greater length than the cleats 13.

A ring 14 is connected with each wheel, each of the said rings being arranged coaxial with the hub and rim, and held inwardly in spaced relation with respect to the rim by means of arbors or sleeves 15 which are arranged on bolts 16, the said bolts passing through the rim, the arbors and the ring, and each bolt is engaged by a nut 17 on the inner face of the ring. The ring 14 is at the inner edge of the rim, and each ring is provided with integral lateral extensions 18, at the inner side of the ring, that is, at the side toward the spokes, and each of the extensions 18 is secured to the inner face of the rim by means of bolts and nuts 19. The end of each extension remote from the ring 14 is bent at an obtuse angle with respect to the body of the extension, to lie flat against the inner face of the rim portion, and the bolts are passed from the outer surface of the rim portion inwardly through the extension and are engaged by the nuts on the inner faces of the extensions.

The drive wheel consists of an eccentric disk 20, having a hub 21 arranged on the axle 1, adjacent to the bearing 6, as before stated, the hub 21 being eccentric to the disk, and a ring 22 is mounted on the disk, the ring being held in place by plane rings 23 and 24, on the inner and outer faces of the disk, respectively, the said rings being secured to the disk 20 by means of screw bolts 25, in such manner that they extend beyond the peripheral surface of the disk and engage the opposite faces of the ring as shown, to hold the ring in the plane of the disk. The ring as shown is a sprocket ring, having sprocket teeth 26, and the said ring is provided on the face adjacent to the wheel with a pair of laterally extending parallel annular ribs or flanges 27 and 28, the said ribs or flanges being spaced apart from each other as shown, to receive between the same arbors or sleeves 29, the said arbors or sleeves being supported by bolts and nuts 30. The bolts are passed inwardly through the flange or rib 28, through the arbors, and through the flange or rib 27, and they are engaged by the nuts on the inner surface of the rib or flange 27. The sleeves or arbors 29 correspond in number and approximate spacing with the sleeves or arbors 15, and each sleeve or arbor 29 is connected to a sleeve or arbor 15 by means of a flexible member 31, a chain in the present instance. Each of the chains 31 is provided at each of its ends with a plate link 32, and each plate link is pivoted to an angular lug 33 on the adjacent sleeve or arbor 15 or 29, as the case may be. Thus the drive wheel 2—7 is connected with the driving sprocket ring 22 by means of the flexible members 31, and each of the sleeves or arbors 15 and 29 is mounted to rotate on an axis radial to the axle 1.

It will be noticed from an inspection of Figs. 2 and 3, that the external diameter of the sprocket ring 22 is the same as the external diameter of the drive wheel 2—7—8—9, but the axis of rotation of said ring is at a higher level than that of the wheel. The teeth of each sprocket ring 22 are engaged by a sprocket chain 34, which connects the ring with a sprocket wheel 35 on the drive shaft 36 of the motor, (not shown).

The hub 2 is provided at its inner end with a brake disk 36, and a brake ring or band 37 engages the grooved periphery of the disk. The ends of the band are secured to a controlling wheel 38, which is keyed to one end of a shaft 39, which is journaled in the disk 20, as shown in Fig. 3, and the ends of the band are secured to the wheel at diametrically opposite points by means of screws 40 or the like. This shaft 39 has secured to its inner end, by means of a key as shown, a controlling lever 41, and it will be evident that by swinging the lever in the proper direction, the tension of the band 37 may be varied. A spacing washer 42 is secured to the inner face of the disk, 20, by means of bolts and nuts 43, and washers 44 are arranged between the wheel 38 and the washer 42 and at the inner face of the disk 20.

In use, the parts occupy the relative position shown in Figs. 1 and 2, in which position the flexible members 31, which are the sole connection between the driving sprocket and the tractor wheels, will be taut at the sides of the said wheel and ring and will be loose at the top and bottom of the said wheel and ring. Thus the tractive power will be brought to bear at that point in the periphery of each traction wheel where it is most needed, and where it will do the most good. In driving the tractor wheel as shown in Fig. 2, the flexible members 31 at the rear side of the wheel and at the front side of the wheel are taut, and they make traction on the said wheel, tending to rotate the same on its axis of rotation. The chains at the rear of the wheel pull directly upward on the same, when the machine is moved in the forward direction, while the chains at the front of the wheel pull directly upward also, when the machine is moved backward, and thus the tractive force is brought to bear at a point where it is needed and where it will act to the best possible advantage. When the element 22 is rotated forwardly for instance, it will be obvious that the chain at the top and bottom of the wheel will be slack. Those at the rear will be taut, and they will pull up on the rear part of the wheel, thus tending to roll the wheel forward. The action of the front chains if there is any pulling action exerted, will be downward, thus assisting in its tendency to rotate.

Each sleeve of the sprocket ring is connected to a sleeve of the tractor wheel next in the rear, as will be evident from an inspection of Fig. 2.

I claim:

1. In combination, a tractor wheel having a ring within the rim at the inner side of the wheel and coaxial with the wheel, radially arranged rollers between the wheel and the ring, a driving ring for connection with a motor arranged at the inner side of the wheel, a disk fixed upon which the driving ring is mounted and arranged eccentrically with respect to the wheel and having its eccentric portion above the axis of rotation of the wheel, and a series of flexible members connecting the driving ring to the wheel, each flexible member being connected to the wheel in rear of its connection with the ring, and being of a length to be taut at the front and rear sides of the wheel, the driving ring having a pair of parallel inwardly extending annular ribs coaxial with the driving ring, rollers journaled between the ribs in spaced relation on radial axes and corresponding in arrangement with the arrangement of the rollers of the wheel, the flexible members connecting each roller of the driving ring with the succeeding roller of the wheel.

2. In combination, a tractor wheel having a ring connected rigidly therewith, within the rim at the inner side of the wheel and coaxial with the wheel, a driving ring for connection with a motor arranged at the inner side of the wheel, a fixed disk upon which the driving ring is mounted and arranged eccentrically with respect to the wheel and having its eccentric portion above the axis of rotation of the wheel, and a series of flexible members connecting the driving ring to the wheel, each flexible member being connected to the wheel in rear of its connection with the driving ring, and being of a length to be taut at the front and rear sides of the wheel, an annular series of rollers journaled on axes radial to the axis of the wheel, an annular series of rollers journaled on the driving ring on axes radial to the axis of rotation of the driving ring, and the flexible members connecting the two series of rollers.

3. In combination, a tractor wheel having a ring connected rigidly therewith, within the rim at the inner side of the wheel and coaxial with the wheel, a driving ring for connection with a motor arranged at the inner side of the wheel, a fixed disk upon which the driving ring is mounted and arranged eccentrically with respect to the wheel and having its eccentric portion above the axis of rotation of the wheel, and a series of flexible members connecting the driving ring to the wheel, each flexible member being connected to the wheel in rear of its connection with the driving ring, and being of a length to be taut at the front and rear sides of the wheel.

4. In combination, a tractor wheel, a driving ring for connection with a motor, arranged adjacent to the wheel, a drum on which the ring is journaled, said drum being eccentric to the wheel for elevating the axis of rotation of the ring above that of the wheel, and a series of flexible members connecting the ring to the wheel, each flexible member being connected to the wheel in rear of its connection with the ring.

5. In combination, a tractor wheel, a driving ring for connection with the motor arranged adjacent to the wheel, a drum on which the ring is journaled, said drum being eccentric to the wheel for elevating the axis of rotation of the ring above that of the wheel, and a series of flexible members connecting the ring to the wheel, each flexible member being connected to the wheel in rear of its connection with the ring.

6. In combination, a tractor wheel, a rotatable driving member having its axis of rotation eccentric to the axis of rotation of the wheel, and a series of flexible connections between the driving member and the wheel, said flexible members being of a length to permit a limited movement of the driving member with respect to the wheel.

7. In combination, a tractor wheel, a rotatable driving member having its axis of rotation eccentric to the axis of rotation of the wheel, and a series of flexible connections between the driving member and the wheel.

ANDREW R. TKACH.

Witnesses:
F. C. BOND,
GRACE A. WOOD.

Copies of this patent may be obtained for five cents each, by addressing the "Commissioner of Patents, Washington, D. C."